United States Patent [19]
Kennedy

[11] 3,833,491
[45] Sept. 3, 1974

[54] PRODUCTION OF MACROCYCLIC COMPOUNDS

[76] Inventor: Carl D. Kennedy, 2302 Amity St., San Diego, Calif. 92109

[22] Filed: Mar. 2, 1973

[21] Appl. No.: 337,413

[52] U.S. Cl............................ 204/158 S, 204/162 S
[51] Int. Cl................................................. B01j 1/12
[58] Field of Search ..................... 204/158 S, 162 S

[56] References Cited
FOREIGN PATENTS OR APPLICATIONS
754,862   8/1956   Great Britain................... 204/158 S

*Primary Examiner*—Howard S. Williams

[57] ABSTRACT

Cyclic ketone di- and triperoxides are converted at temperatures of from about 20°C. to 300°C. by the use of ultrasonic energy to macrocyclic hydrocarbons and macrocyclic lactones.

10 Claims, No Drawings

PRODUCTION OF MACROCYCLIC COMPOUNDS

BACKGROUND OF THE INVENTION

1. Field of the Invention

This invention relates to the preparation of macrocyclic compounds. In one aspect, it relates to a method for producing macrocyclic hydrocarbons and macrocyclic lactones at temperatures of from about 20°C. to 300°C. In yet another aspect, it relates to a method for producing macrocyclic hydrocarbons and macrocyclic lactones from cyclic ketone di- and triperoxides by the use of ultrasonic energy.

2. Description of the Prior Art

It has long been known that dimeric and trimeric peroxides are formed by the action of hydrogen peroxide on cyclic ketones, such as cyclohexanone. U.S. Pat. No. 3,528,898 entitled "Process For the Preparation of Macrocyclic Compounds By Photolytic Decomposition of Cyclic Ketone Peroxides" discloses the production of macrocyclic hydrocarbons and/or macrocyclic lactones by thermal decomposition above 100°C or ultraviolet light induced decomposition of dimeric and trimeric peroxides. Problems are encountered when conducting such a process by thermal decomposition in that a substantial portion of the reactants are converted to by products that adhere to the surface of the reactor thereby resulting in a charred material. When such charring occurs, not only is the product yield decreased substantially, but additional separation, purification and processing steps are encountered which are difficult and expensive. Thus, new methods are constantly being sought for the production of macrocyclic compounds wherein yields are improved and/or one is not faced with charring and reactor build up problems. Further, a simple and economical method for the preparation of macrocyclic lactones of the musk compound type, which for example are useful in perfumes, has long been desired.

OBJECTS OF INVENTION

An object of the invention is to provide a method for synthesizing macrocyclic compounds.

Another object of the present invention is to provide an improved process for the synthesis of macrocyclic compounds from cyclic ketone di- and triperoxides.

Yet another object of the invention is to provide an improved process for this synthesis of macrocyclic hydrocarbons and macrocyclic lactones from cyclic ketone di- and-triperoxides which can readily be carried out at temperatures of from about 20°C. to 300°C.

These and other objects, advantages, and features of the present invention will become apparent to those skilled in the art from a reading of the following detailed description.

SUMMARY OF THE INVENTION

According to the present invention I have now found an improved process for the synthesis of macrocyclic hydrocarbons and/or macrocyclic lactones from cyclic ketone di- and triperoxides.

Further according to the invention I have found that cyclic ketone di-and triperoxides can be readily converted to cyclic lactones and/or cyclic hydrocarbons at temperatures from about 20°C. to 300°C. by the use of ultrasonic energy.

Further according to the invention I have found that when employing ultrasonic energy in the production of cyclic lactones and/or cyclic hydrocarbons one can substantially eliminate charred material build up within the reactor.

DESCRIPTION OF THE PREFERRED EMBODIMENTS

As previously stated, the present invention is a process for the production of macrocyclic compounds wherein cyclic ketone di-and triperoxides are converted to cyclic lactones and/or cyclic hydrocarbons by the use of ultrasonic energy at temperatures of from about 20°C. to 300°C. The term "ultrasonic energy" as employed in the present specification refers to sound vibrations, variations of density in elastic media, whose frequencies are beyond the auditory limit. Thus, these frequencies are generally above 20,000 cycles per second. Any suitable means, which are well known in the art, can be employed to produce the desired ultrasonic frequencies which in turn produce the ultrasonic energy employed to transform the cyclic ketone di and triperoxides. Such means which can be employed are the Galton Pipe Affect, a magnetostriction ultrasonic generator, quartz plates, a piezoelectric sound transmitter and the like.

The dimeric and trimeric peroxides used in practicing the present invention are well known and are described in readily available literature. For example, the diperoxides can be prepared as described in R. Criegee, et al., Ann; 583, 6 (1953); M. S. Kharasch et al., J. Org. Chem., 23, 1322 (1958); and, T. Ledaal, Acta Chem. Scand., 21, 1656 (1967). The trimeric peroxides which can be employed in the practice of the present invention to produce the desired macrocyclic hydrocarbons and/or macrocyclic lactones are prepared as described in R. Criegee et al., Ann., 565, 7 (1949); and W. Dilthey et al., J. prakt. Chem., 154, 219 (1940).

In practicing the invention care should be exercised in that peroxides occasionally explode with considerable violence. Thus, it is advisable to allow a small amount of a low molecular weight polar solvent, such as menthanol or benzene to remain in contact with the peroxide compounds being employed as the reactants so that such explosions can be avoided.

When employing the method of the present invention for the preparation of macrocyclic compounds the reactant peroxide is contacted with ultrasonic energy produced by an ultrasonic energy source for a period of time sufficient to allow the desired conversion of said peroxides to transpire. Because of the range of temperatures at which such reactions can occur, the reactor is equipped with heat transfer means so that the temperatures of such reaction can readily be controlled by either heating or cooling or a combination of both. Especially desirable results from a processing stand point can be obtained when the peroxide conversion using ultrasonic energy is carried out at a temperature of from about 50°C. to 100°C. The reactant peroxide can also, when desirable, be dissolved in a suitable organic solvent, such as cyclohexane, and the resulting solution contacted with ultrasonic energy at a temperature below the temperature of vaporization of the solvent.

The pressure at which such conversion is carried out can vary widely but will generally range from about 1 psia. to about 1,000 psia. However, especially desirable results are obtained wherein the peroxide conversion is carried out at a pressure within the range of from about 15 psia. to 500 psia.

The method of the present invention can readily be operated in a continuous or batch manner. For the sake of simplicity the method will be discussed as a continuous process. The solution containing the peroxide reactant is slowly passed through the reactor by any suitable means, such as positive displacement pump. The reactant is maintained at the desired temperature and pressure, as previously described, while same is in the reactor and subjected to ultrasonic energy. The effluent from the reactor is then subjected to normal purification techniques, such as distillation, to isolate the desired macrocyclic hydrocarbons and macrocyclic lactones from by-products and/or unreacted materials which may be present in said effluent. When the macrocyclic hydrocarbons and macrocyclic lactones are produced by the method described above using ultrasonic energy, substantially no product build-up in the reactor and substantially no charred products are detected. This is true whether the reaction temperature is at the lower limit or the upper limit. Further, yields and product purity are improved at elevated temperature when said ultrasonic energy is employed.

As previously stated, the present invention concerns the conversion of diperoxides and triperoxides to desired macrocyclic hydrocarbons and/or macrocyclic lactones. In order to more fully depict the reaction products the following structural equations are set forth as illustrative of such conversions.

The diperoxide reactants are derived from cyclic ketones characterized by the presence of a 4-membered or larger ring.

The diperoxides are converted to the desired products according to the overall equation:

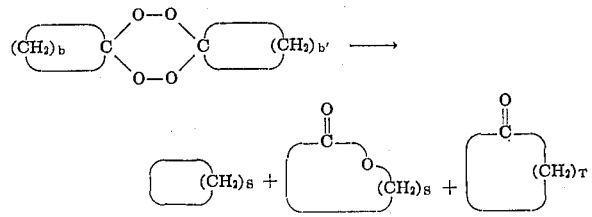

Wherein $b$ and $b'$ are integers greater than or equal to 3, S is $2b$, $2b'$ or $b + b'$, and T is $b$ or $b'$.

The triperoxide reactants are also derived from cyclic ketones characterized by the presence of a 4-membered or larger ring.

The triperoxides are converted to the desired products according to the equation:

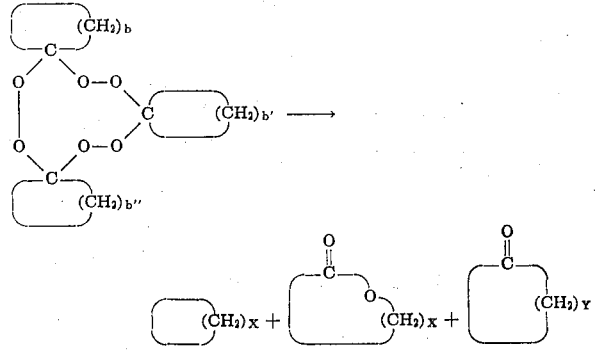

Wherein $b$, $b'$ and $b''$ are integers greater than or equal to 3, X is $3b$, $3b'$, $3b''$, or any combination thereof, and Y is $b$, $b'$ or $b''$.

Whereas both hydrocarbons and lactones are generally produced on conversion of the peroxide reactants, the hydrocarbon usually predominates when ketone triperoxides are thermally decomposed. With either di- or triperoxides, a portion of the cyclic ketone used to prepare the peroxide reactant is usually recovered as a by-product of the peroxide conversion reaction.

EXAMPLE I — DECOMPOSITION OF DIPEROXIDE

One hundred grams of cyclohexanone diperoxide is dissolved in 10 liters of cyclohexane. This mixture is then heated to 90°C. prior to being passed through the reactor section. The mixture is then slowly passed through the reactor which is equipped with an internally mounted ultrasonic generator head. The reactor is a cylinder 2 inches in diameter and 2 feet in length. The mixture in the reactor section is kept under about 220 psia. pressure and pumped through the reactor section by a positive displacement pump. The reactor temperature is controlled via heat transfer coils such that the liquid reaction mixture is maintained at about 90°C. to 100°C. within the reactor section. The mixture recovered from the reactor section is then subjected to high vacuum distillation to isolate cyclodecane and 11 — undecanolactone.

EXAMPLE II —DECOMPOSITION OF TRIPEROXIDES

A. One hundred grams of cyclohexanone triperoxide is dissolved in 10 liters of cyclohexane. This mixture is then heated to about 75°C. prior to passing said heated mixture through the reactor section. The mixture is then slowly passed through the reactor section which is the same as described in Example I. The mixture is maintained at a pressure of about 220 psia. pressure while in the reactor section and the reaction mixture is passed through the reactor section by a positive displacement pump. The reactor temperature is maintained at the desired temperature of about 90° C. by equipping the reactor section with heat transfer coils to insure that the reaction mixture is maintained at the predetermined temperature. The reaction mixture recovered from the reaction zone is subjected to high vacuum distillation to isolate cyclopentadecane and 16-hexadecanolactone.

B. One hundred grams of cyclohexanone triperoxide is dissolved in 30 liters of n-hexane. The resulting mixture is then heated to 100°C. prior to passing it through the reactor section, the reactor section being that described in Example I. The mixture is pumped through the reactor section by means of a positive displacement pump working against a carefully maintained back pressure (i.e. reactor pressure) of 220 psia. The temperature in the reactor section is also controlled so as to maintain the mixture at a temperature of about 150°C. The feed rate into the reactor section is controlled so the peroxide conversion reactors are completed in the reactor section. The mixture recovered from the reactor is then distilled to recover the desired cyclopentadecane and 16- hexadecanolactone.

The method of using ultrasonic energy as set forth in Example II (B), when compared with the results obtained by a thermal decomposition process without the use of ultrasonic energy, showed that by employing such ultrasonic energy one could readily increase the yield of the desired macrocyclic hydrocarbons and/or lactones by about 5 to 10 percent, that there is substantially no charred by-products, that there is no detectable build-up of by-products within the reactor section, and that about 10 percent less reaction time was required.

The foregoing discussion and description has been made in connection with preferred specific embodiments of the method for producing macrocyclic compounds using ultrasonic energy. However, it is to be understood that the discussion and description is only intended to illustrate and teach those skilled in the art how to practice the invention.

Having thus described the invention, I claim:

1. A method for preparing macrocyclic compounds which comprises converting cyclic ketone di- and triperoxides by ultrasonic energy.

2. The method of claim 1 wherein the conversion of said cyclic ketone di- peroxides is carried out at a temperature of from about 20°C. to 300°C., at a pressure of from about 1 psia. to 1,000 psia. and said macrocyclic compounds are prepared according to the general equation:

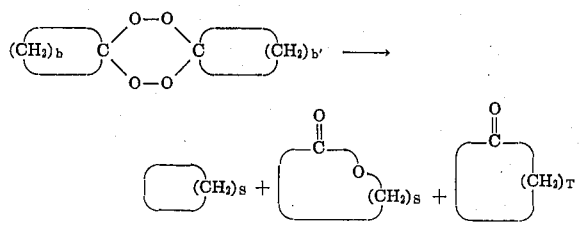

Wherein said cyclic ketone di- peroxides are at least 4-membered ring structures, $b$ and $b'$ are integers greater than or equal to 3, S is $2b$, $2b'$ or $(b + b')$, and T is $b$ or $b'$.

3. The method of claim 2 wherein said conversion of said cyclic ketone diperoxides is carried out at a temperature in the range of from about 50°C. to 100°C. at a pressure of from about 15 psia. to about 500 psia.

4. The method of claim 3 wherein cyclohexanone diperoxide is converted to cyclodecane and 11- undecanolactone at a temperature of from about 90°C. to 100°C. and a pressure of about 220 psia.

5. The method of claim 4 wherein said conversion is carried out in the presence of an inert organic diluent.

6. The method of claim 1 wherein the conversion of said cyclic ketone triperoxides is carried out at a temperature of from about 20°C. to 300°C., at a pressure of from about 1 psia. to 1,000 psia., and said macrocyclic compounds are prepared according to the general equation

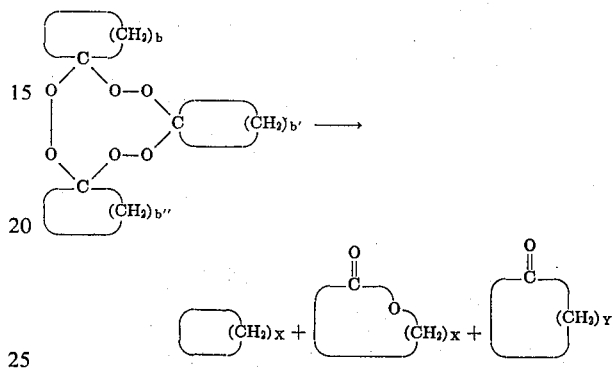

Wherein said cyclic ketone triperoxides are at least 4-membered ring structures, $b$, $b'$ and $b''$ are integers greater than or equal to 3; X is $3b$, $3b'$, $3b''$, or any combination thereof; and, Y is $b$, $b'$ or $b''$.

7. The method of claim 6 wherein cyclohexanone triperoxide is converted to cyclopentadecane and 16 - hexadecanolactone at a temperature of about 150°C, a pressure of about 220 psia., and said conversion is carried out in the presence of an inert organic solvent.

8. The method of claim 6 wherein said conversion of said cyclic ketone triperoxides is carried out at a temperature in the range of from about 50°C. to 100°C. at a pressure of from about 15 psia. to about 500 psia.

9. The method of claim 8 wherein cyclohexanone triperoxide is converted to cyclopentadecane and 16 - hexadecanolactone at a temperature of about 90°C. and a pressure of about 200 psia.

10. The method of claim 9 wherein said conversion is carried out in the presence of an inert organic diluent.

* * * * *